(12) United States Patent
Tsuji

(10) Patent No.: US 6,581,709 B2
(45) Date of Patent: Jun. 24, 2003

(54) SMALL ARTICLE COMPARTMENT DEVICE FOR SADDLE TYPE VEHICLE

(76) Inventor: Misturu Tsuji, c/o 1450-6 Mori, Mori-machi, Shuuchi-gun, Shizuoka-ken (JP)

( * ) Notice: Subject to any disclaimer, the term of this patent is extended or adjusted under 35 U.S.C. 154(b) by 29 days.

(21) Appl. No.: 09/681,661

(22) Filed: May 17, 2001

(65) Prior Publication Data

US 2001/0048212 A1 Dec. 6, 2001

(30) Foreign Application Priority Data

May 30, 2000 (JP) ........................................ 2000-161292

(51) Int. Cl.[7] .............................................. B62D 25/14
(52) U.S. Cl. ........................... 180/90; 296/73; 296/78.1
(58) Field of Search ............................ 280/288.4, 263, 280/769; 180/89.1, 90; 296/37.1, 37.12, 70

(56) References Cited

U.S. PATENT DOCUMENTS

| | | | | |
|---|---|---|---|---|
| 4,164,406 A | * | 8/1979 | Phillips | 504/195 |
| 4,522,442 A | * | 6/1985 | Takenaka | 180/215 |
| 4,630,160 A | * | 12/1986 | Murayama | 296/37.1 |
| 4,687,072 A | * | 8/1987 | Komuro | 180/219 |
| 4,830,134 A | * | 5/1989 | Hashimoto | 180/219 |
| 4,895,284 A | * | 1/1990 | Nogami et al. | 224/413 |
| 5,040,632 A | * | 8/1991 | Fujii et al. | 180/219 |
| 5,127,561 A | * | 7/1992 | Miyamoto | 224/413 |
| 5,952,729 A | * | 9/1999 | Shiratori et al. | 307/9.1 |
| 6,157,297 A | * | 12/2000 | Nakai | 340/461 |
| 6,158,279 A | * | 12/2000 | Saiki | 324/166 |
| 6,396,394 B1 | * | 5/2002 | Suzuki et al. | 340/425.5 |
| 6,418,360 B1 | * | 7/2002 | Spivey et al. | 280/5.501 |
| 6,428,075 B2 | * | 8/2002 | Kamemizu et al. | 292/210 |

* cited by examiner

*Primary Examiner*—Paul N. Dickson
*Assistant Examiner*—Toan C To

(57) ABSTRACT

An improved type of storage compartment and display location for a small vehicle such as a motor scooter. The handlebar cover is formed with a recess which forms at the front thereof a storage compartment where small articles can be stored and at the rear thereof an area where the display can be mounted. This permits mounting of the display from above and places it closer to the rider so that it can be more easily viewed.

10 Claims, 3 Drawing Sheets

SMALL ARTICLE COMPARTMENT DEVICE FOR SADDLE TYPE VEHICLE

BACKGROUND OF INVENTION

This invention relates to a small article compartment device for saddle type vehicles and more particularly to an improved storage compartment for a small vehicle such as a motor scooter and an associated instrumentation arrangement associated therewith.

There is a very popular type of motor vehicle referred to as a "motor scooter", which generally has a saddle type seat in which the rider is seated with his legs, disposed forwardly of the seat on a footboard. A handlebar assembly is disposed forwardly of the seat for steering of the vehicle.

It has been proposed to provide a meter display mounted in association with the handlebar for conveying certain running conditions to the operator of the vehicle. It has also been proposed to provide a storage space for storage small articles in the space in the vehicle body beneath the seat.

One of the problems with this type of storage compartment is that frequently the operator may wish to be able to reach or access articles in the storage compartment without stopping the scooter and/or getting off of the seat.

It is, therefore, a principal object to this invention to provide an improved and more readily accessible storage compartment for such vehicles.

In the type of instrument or display mounting employed on these vehicles, the display frequently is difficult to read from the rider seated on the seat. This is because the display may be positioned too far forwardly and angled too much to the horizontal to permit ease of viewing, particularly when liquid crystal displays are employed.

It is, therefore, a still further object to this invention to provide an improved display arrangement for utilize with motor scooters.

SUMMARY OF INVENTION

This invention is adapted to be embodied in a vehicle having a seat upon which a rider is seated with his feet extending forwardly and downwardly. A handlebar assembly is provided at the front of the seat and the vehicle for steering of the vehicle in its path of movement. A cover is associated with the handlebar and defines an internal recess that provides a storage compartment. A removable cover closes the recess and the storage compartment.

DETAILED DESCRIPTION

Figure 1:
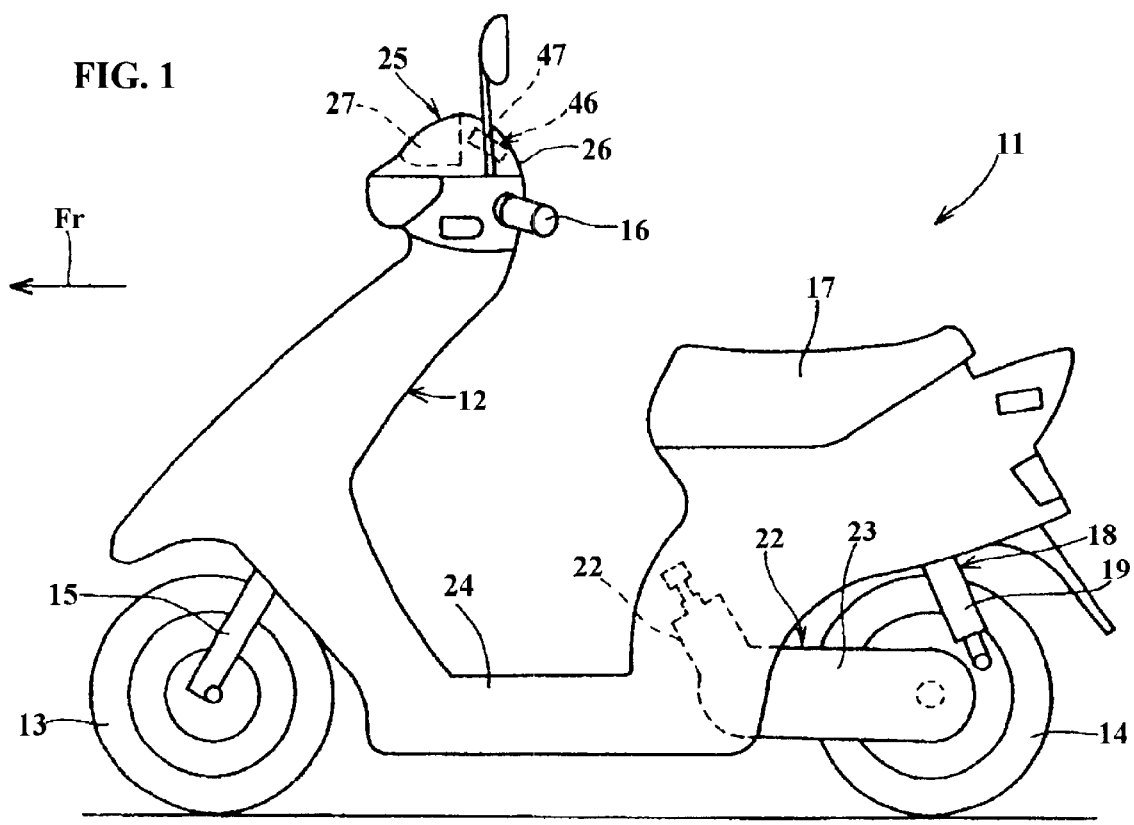
FIG. 1 is a side elevational view of a motor scooter constructed in accordance with an embodiment of the invention.

Referring first to FIG. 1, a motor scooter constructed in accordance with an embodiment of the invention is identified generally by the reference numeral 11. The motor scooter 11 includes a main body portion, indicated generally by the reference numeral 12, from which a front wheel 13 and rear wheel 14 are suspended. The front wheel 13 is dirigibly supported by the main body portion 12 in a known manner by means that includes a front fork 15 that is steered by a handlebar assembly 16.

The rear wheel 14 underlies a rider's seat 17 and is journalled by a suspension system, indicated generally by the reference numeral 18 and which includes a rear shock absorber 19. An engine transmission assembly, indicated generally by the reference numeral 21 consists of an internal combustion engine 22 and a transmission 23 that drives the rear wheel 14. This engine transmission assembly 21 is pivotally mounted on the main body portion 12 by the suspension system 18 in a suitable manner for accommodating the suspension movement of the rear wheel 14.

A foot area 24 is formed by the main body portion 12 forwardly of the seat 17 so that a rider seated on the seat may place his feet on the foot area 24.

Figure 2:
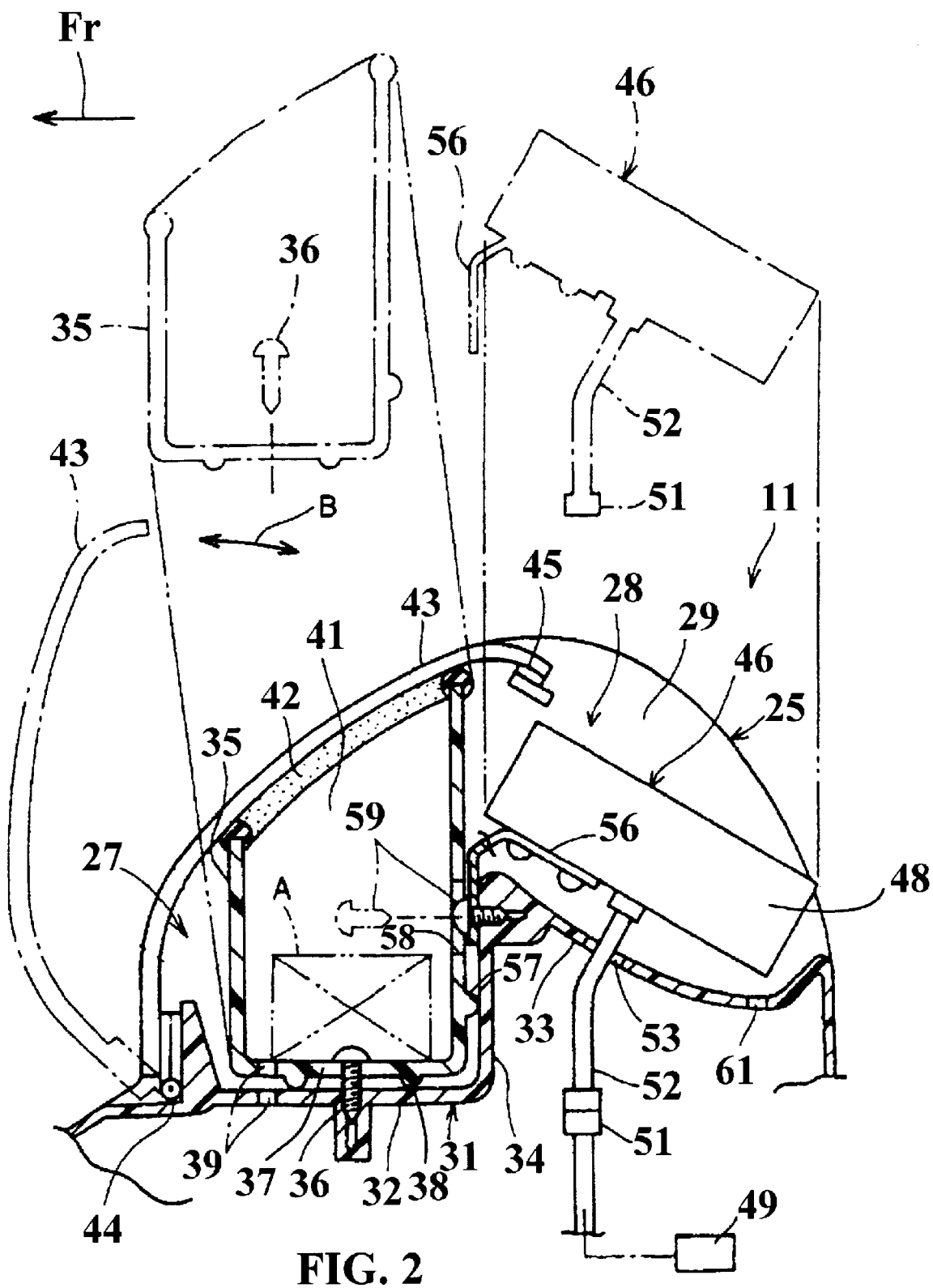
FIG. 2 is an enlarged side elevational view showing the handlebar cover and components associated therewith, in part in cross section, and in a disassembled condition for certain of the components in phantom. The removal closure is shown in its closed position in solid lines and in its opened position in phantom lines.
Figure 3:
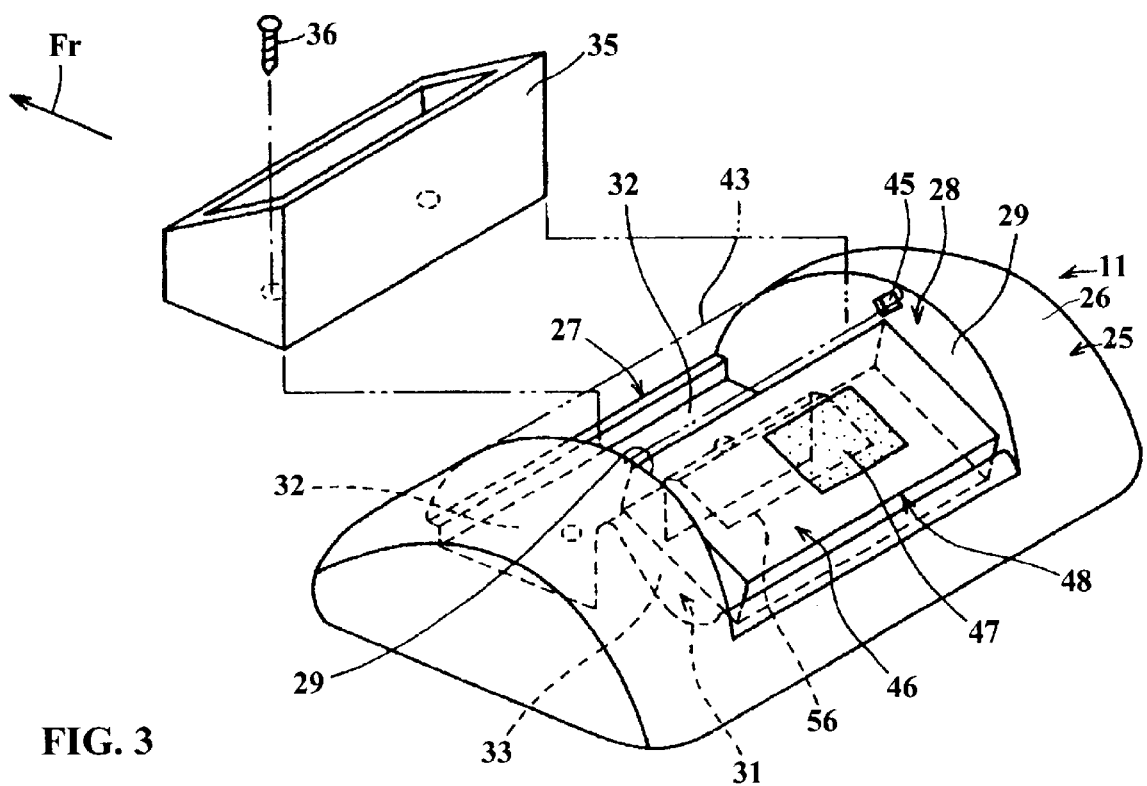
FIG. 3 is an exploded perspective view of the construction shown in FIG. 2.

The handlebar assembly 16 is enclosed by a cover comprised of a main cover portion 25 and which is shown in perspective view in FIG. 3. FIG. 2 is a partial cross sectional view through this assembly.

Referring now primarily to FIGS. 2 and 3, the handlebar main cover portion 25 has a generally cylindrical configuration and is formed from a suitable resinous plastic material. Its outer surface 26 has a generally curvilinear shape and defines an internal recess in an upper central portion thereof that is comprised of a first, forward article storage compartment portion, indicated generally by the reference numeral 27, and a rearwardly placed somewhat shallower instrument recess portion 28. The portions 27 and 28 are defined between generally vertically extending sidewalls 29 that form the side-to-side extremities of both of the recess portions 27 and 28.

In addition, there is a lower wall, indicated generally by the reference numeral 31 that forms the lower peripheral edges of the recesses portions 27 and 28. This lower wall 31 is comprised of a forward, first lower portion 32 that forms the lower end of the article storage compartment portion 27 and a somewhat curved upper wall portion 33 that forms the lower end of the instrument recess portion 28. A vertically extending wall 34 integrally connects these lower wall portions 32 and 33 of the lower wall 31.

A resinous storage box, indicated generally by the reference numeral 35, is positioned within the article storage compartment portion 27 and is affixed thereto by means of a threaded fastener 36. The fastener 36 passes through an opening in a lower wall 37 of the storage box 35 and is threaded into a preformed opening in the lower wall portion 32. Sealing ribs 38 hold the lower wall 37 of the storage box 35 from the lower wall 31 of the handlebar main cover portion 25. Drain holes 39 are formed in the lower wall portions 37 and 32 in alignment with each other so that any water that may accumulate in this chamber can be readily removed. The storage box 35 forms a recess 41 in which small articles as indicated in phantom by the reference character "A" in FIG. 2 may be placed.

An elastomeric gasket 42 is formed with a groove so as to receive the upstanding walls of the storage box 35. This gasket 42 is engaged by a pivotally supported closure member 43 so as to provide sealing when this closure member 43 is in its closed position as shown in solid lines in FIG. 2. The closure member 43 is pivotally supported relative to the main cover portion 25, as shown by the arrow B, by means of pivot pins 44 that are disposed at the forward portion of the lower wall portion 32 of the handlebar main cover portion 25.

To retain the closure member 43 in its engaged or closed position from the position shown in phantom in FIG. 2, a hook and loop type fastener 45 may be provided at one side thereof. The operator can easily place his fingers under the remaining edge of the closure member 43 to pivot it to the open direction.

An instrument or display, indicated generally by the reference numeral 46, is adapted to be received in the instrument recess portion 28 and inserted from above as shown in the phantom line view in FIG. 2. This display 46 has a liquid crystal display portion 47 in the upper surface of its outer housing, indicated by the reference numeral 48. Although various types of displays may be employed, the liquid crystal display portion 47 may display vehicle speed from a sensor 49 (FIG. 2) mounted on the vehicle main body portion 12 and connected by a quick disconnect connector 51 to a wire harness 52. This wire harness 52 passes through an opening 53 formed in the lower wall portion 33. Thus, the device can be easily inserted from above.

A mounting bracket 54 is fixed to the underside of the case 48 by threaded fasteners and has a depending leg that extends along the vertically extending wall 34 on the storage compartment side thereof. The storage box 35 is held in spaced relationship to the wall 34 by a further rib 57 and is formed with an opening 58 through which a threaded fastener 59 may be passed so as to fix the mounting bracket 56 in position. Of course, the display 46 is also so mounted at this time.

It should be seen that the configuration is such that the display 46 can be inserted before the storage box 35 is put in place so as to give the operator more room for accessing to provide the connection. Nevertheless, it is also possible to mount the display after the storage box 35 is in position.

A drain hole 61 is formed at the lowest part of the wall portion 33 for draining accumulated water in the instrument recess portion 28.

Thus, from the foregoing description it should be readily apparent that the described embodiment is very effective in providing a very accessible storage compartment that the operator can access while seated on the seat 17. In addition, because of the forward positioning of this storage compartment, the display 46 can be mounted closer to the seat 17 so as to facilitate the viewing of the information contained on the display. It should be understood that various other types of controls may be mounted in the instrument or display 46 including drivers for display of various information. Further changes and modifications may be made without departing from the spirit and scope of the invention, as defined by the appended claims.

What is claimed is:

1. A vehicle having a seat adapted to receive a rider with feet extending forwardly and downwardly, a handlebar at the front of said seat for steering of said vehicle in its path of movement, a cover extending over and covering a portion of said handlebar and defining an internal recess above said handlebar that provides a storage compartment and a removable closure for said storage compartment.

2. A vehicle as set forth in claim 1 wherein a liquid crystal display is positioned in the cover recess.

3. A vehicle as set forth in claim 2 wherein the cover internal recess is elongated in at least one direction from the liquid crystal display to provide a compartment for other objects.

4. A vehicle as set forth in claim 3 wherein the elongated portion of the recess is closed by the removable closure.

5. A vehicle as set forth in claim 4 wherein the removable closure has an edge portion that is juxtaposed to the liquid crystal display when said removable closure is closed.

6. A vehicle as set forth in claim 2 wherein the elongation of the recess is in a forward direction.

7. A vehicle as set forth in claim 6 wherein the elongated portion of the recess is closed by the removable closure.

8. A vehicle as set forth in claim 7 wherein the removable closure has an edge portion that is juxtaposed to the liquid crystal display when said removable closure is closed.

9. A vehicle as set forth in claim 8 wherein the liquid crystal display is fixed to the cover from above.

10. A vehicle as set forth in claim 2 wherein the liquid crystal display is fixed to the cover from above.

\* \* \* \* \*